US012129893B2

(12) United States Patent
Beaurepaire et al.

(10) Patent No.: US 12,129,893 B2
(45) Date of Patent: Oct. 29, 2024

(54) BEARING AND METHOD OF MANUFACTURE

(71) Applicants: Mahle Engine Systems UK Ltd, Rugby (GB); MAHLE International GmbH, Stuttgart (DE); MAHLE France SAS, Rouffach (FR)

(72) Inventors: Olivier Beaurepaire, Rumilly (FR); David Merritt, Warwickshire (GB)

(73) Assignees: Mahle Engine Systems UK Ltd (GB); Mahle International GmbH (DE); MAHLE France SAS (FR)

( * ) Notice: Subject to any disclaimer, the term of this patent is extended or adjusted under 35 U.S.C. 154(b) by 0 days.

(21) Appl. No.: 18/201,421

(22) Filed: May 24, 2023

(65) Prior Publication Data
US 2023/0383785 A1    Nov. 30, 2023

(30) Foreign Application Priority Data

May 24, 2022   (GB) .................................. 2207594

(51) Int. Cl.
| | |
|---|---|
| *F16C 9/02* | (2006.01) |
| *F16C 9/04* | (2006.01) |
| *F16C 33/02* | (2006.01) |
| *F16C 33/20* | (2006.01) |

(52) U.S. Cl.
CPC ................. *F16C 9/02* (2013.01); *F16C 9/04* (2013.01); *F16C 33/02* (2013.01); *F16C 33/208* (2013.01)

(58) Field of Classification Search
CPC .......... F16C 9/02; F16C 33/02; F16C 33/101; F16C 33/106; F16C 33/208; F16C 9/04
See application file for complete search history.

(56) References Cited

U.S. PATENT DOCUMENTS

| 5,788,380 A | * | 8/1998 | Niegel | .................. | F16C 17/022 |
| | | | | | 384/429 |
| 6,257,768 B1 | * | 7/2001 | Martin | ...................... | F16C 9/04 |
| | | | | | 384/430 |
| 2022/0018387 A1 | * | 1/2022 | Goto | ......................... | F02F 7/00 |

FOREIGN PATENT DOCUMENTS

| DE | 2359634 A1 | 6/1975 |
| EP | 0074676 A1 | 3/1983 |

OTHER PUBLICATIONS

European Search Report dated Oct. 6, 2023 for European Application No. 23174062.2.
English abstract for EP-0074676.

\* cited by examiner

*Primary Examiner* — Syed O Hasan
(74) *Attorney, Agent, or Firm* — Fishman Stewart PLLC

(57) ABSTRACT

A bearing is disclosed. The bearing includes a first half shell and an eccentric second half shell, the first half shell and the second half shell configured to connect at a joint to form a cylindrical bearing. The first half shell has a first crown thickness at a first crown of the first half shell, and a first wall thickness between the first crown and the joint. The second half shell has a second crown thickness at a second crown of the second half shell, and a second wall thickness between the second crown and the joint. The second crown thickness is greater than the first crown thickness, and the first wall thickness is equal to the second wall thickness at a point of equal thickness between 10 and 60 degrees from the joint.

18 Claims, 2 Drawing Sheets

BEARING AND METHOD OF MANUFACTURE

CROSS-REFERENCE TO RELATED APPLICATION

This application claims priority to Great Britain Application No. GB 2207594.9 filed on May 24, 2022, the contents of which are hereby incorporated by reference in its entirety.

TECHNICAL FIELD

The present invention relates to a bearing and a method of manufacturing a bearing. The bearing may be a bearing for a reciprocating engine, such as a main bearing, a connecting rod bearing, a journal bearing or the like.

BACKGROUND

Bearings, or bearing elements, are commonly used in engines, for example as crankshaft and/or camshaft supporting bearings and as big end bearings and small end bushings in connection rods.

Bearings used in internal combustion engines conventionally have a layered construction, in which a substrate comprising a strong backing material is coated with one or more layers having preferred tribological properties to provide a sliding surface that, in use, faces a cooperating moving part such as a crankshaft journal. In known bearing shells, the substrate comprises a backing (typically of steel, 1-3 mm in thickness) coated with a lining layer (typically of aluminium alloy or bronze, 100-300 μm in thickness), and the substrate is in turn coated with an overlay. The overlay is typically 6 to 25 μm thick and may be formed of a plastic polymer-based composite layer (e.g. a polyamideimide overlay) or a metal-alloy layer (e.g. a tin-based alloy overlay).

Such bearing elements typically comprise a pair of complimentary bearing shells (usually arranged as upper and lower bearing shells) that are brought together to define a bore for receiving and supporting a rotatable shaft. A support structure for the bearing element is commonly provided by two complimentary sections or portions of a housing, for example an engine housing comprising an engine cap and an engine block, or a connecting rod housing, which are brought together around the shaft and the bearing shells provide running surfaces that bear against the shaft.

Such bearing elements require hydrodynamic lubrication in order to maintain a film of lubricating oil in a bearing clearance located between the bearing shells and the rotating shaft. Lubrication is required to prevent direct contact between the running services and the shaft that would otherwise lead to increased friction, elevated temperatures and rapid wear of the bearings and would lead to an increased risk of metal-to-metal contact and eventually seizure of the shaft and/or damage to the crankshaft.

In order to lubricate the bearings, an internal combustion engine is typically provided with an oil pump which pumps lubricating oil under pressure into the bearing clearance between the bearing shells and the rotating shaft. The lubrication oil is pumped to the inner face of one or both bearing shells (e.g. into a groove in the inner face of one or both bearing shells).

As bearings elements used in engines are typically comprised of two bearing shells that are brought together to form a bore for a shaft, it is an inherent result of their construction that they permit axial side leakage of oil at the joint faces (the short faces connecting the inner and outer curved surface of each end of each bearing shell which butt against each other when the bearing shells are brought together). This causes oil to pass from the bearing clearance and away from the running surfaces. Accordingly, engines commonly require oil pumps to have a high flow rate in order to maintain the oil pressure required to maintain a film of oil between the running surfaces and the shaft and in order to avoid the undesirable effects described above.

It is common practice in the manufacture of bearing elements for engines to provide each bearing shell with a relief region at both ends of the bearing shell. The relief regions may comprise joint face relief regions (bore relief regions) and/or eccentric relief regions. The relief regions adjacent the end faces provide a locally increased bearing clearance, which increases towards the adjacent end face.

Eccentric relief regions are regions that are machined (e.g. bored) to provide a greater bearing clearance than at the crown (mid-way circumferentially between the end faces). Commonly the eccentric relief regions extend to, or close to, the crown. For example the eccentric reliefs may be machined to be curved about a centre of curvature that is slightly removed from the corresponding bearing shell, relative to the centre of rotation of the shaft, and which has a slightly larger radius of curvature than the separation between the axis of rotation and the internal face at the crown. Eccentricity controls movement of the shaft, in use, to reduce engine noise, whilst providing adequate oil flow to dissipate heat from the bearing. The eccentric relief regions typically extend no more than 90° from the adjacent end face.

It is accepted to measure the minimal value of bearing wall thickness at a certain specified height or angle, in order to exclude the zone of joint face relief, also known as crush relief or bore relief.

Eccentricity is defined by the difference between the thickness of a shell at its crown, minus the shell wall thickness at a particular eccentricity angle, or eccentricity point. The eccentricity angle is defined as an angle from the joint face of a half shell, relative to the geometric centre of the bearing outside surface.

Traditionally, both upper and lower half bearings are designed with identical profiles, and in eccentric bearings both bearing half shells typically have the same thickness profile and the same eccentricity.

Due to the asymmetric nature of the loads and of the distortions in engine crankshaft and conrod hydrodynamic bearings, however, in some instances bearings have been provided with half shells having non-identical bearing surfaces.

One such prior art bearing is disclosed in DE2359634A and known as the "Delta wall" bearing. DE2359634A discloses a radial plain bearing consisting of two bearing shell halves, in which the two semi-cylindrical bearing shell halves have different internal radii. The wall thickness of each bearing half-shell shell is uniform, and the bearing shell half with the larger radius (and thus the thinner wall) is arranged on the side of the bearing bracket which experiences a greater elastic resilience while running. The thicker bearing half shell is positioned on the half of the bearing which is loaded while running, while the thinner half shell is positioned on the unloaded half of the bearing.

In DE3262556D1 on the other hand, a half shell with an eccentric bearing surface was used on the unloaded cap-side of a conrod big end bearing, while a non-eccentric bearing surface was used on the loaded rod side of the bearing. DE3262556D1 states that when the bearing is deformed under a relatively high tensile load, the eccentric half of the bearing shell is deformed in such a way that a circular-cylindrical bearing geometry is established in the operating state.

SUMMARY

The invention provides a bearing and a method of manufacturing a bearing, as defined in the appended independent claim(s) to which reference should now be made. Preferred or advantageous features of the invention are set out in dependent subclaims.

A first aspect of the present invention may thus provide a bearing comprising a first half shell and a second half shell, in which the first and second half shells are configured to connect at a joint to form a cylindrical bearing. The second bearing half shell is an eccentric second half shell (i.e. a half shell having an eccentric bearing surface).

The first half shell has a first crown thickness at a crown of the first half shell, and a first wall thickness between the crown and the joint. The second half shell has a second crown thickness at a crown of the second half shell, and a second wall thickness between the crown and the joint. The second crown thickness is greater than the first crown thickness.

The first wall thickness may be equal to the second wall thickness at a point of equal thickness between 10 and 60 degrees from the joint.

The two bearing half shells are semi-cylindrical half shells which connect at respective joint faces to form a circular-cylindrical shell, so that when two half shells are connected, the cylindrical bearing comprises two joints separated by 180 degrees. The point of equal distance is defined as an angular distance measured from the joint, or the joint faces of the half shells, relative to the geometric centre of the cylindrical bearing.

Each bearing half shell comprises a bearing surface on the inside (the concave side) of the curved shell. As the half shells may have eccentric bearing surfaces, the geometric centre of the bearing is defined relative to the outer surfaces of the bearing. When the two half shells are connected together, the outer surfaces of the half shells form a cylindrical bearing configured to be received in a cylindrical bore of a bearing housing. Due to the eccentricity of the bearing surface of the second half shell, the thickness of the second bearing shell varies between the crown and the joint faces. The second wall thickness therefore varies according to the angular position on the half shell.

The first bearing half shell may have a semi-circular profile and a uniform wall thickness, such that the first bearing half shell is not eccentric. Alternatively the first half shell may be a first eccentric half shell (i.e. a half shell having an eccentric bearing surface). Where the first half shell is eccentric, the thickness of the first bearing shell varies between the crown and the joint faces, so that the first wall thickness varies according to the angular position on the half shell.

The wall thickness of a bearing half shell is the total thickness of the bearing, regardless of the number of layers the bearing contains. Wall thickness is thus the thickness of the bearing shellbetween the cylindrical outer surface of the bearing and the eccentric bearing surface against which a journal will run in use.

The bearing of the present invention thus comprises two bearing half shells having crowns of different thicknesses, and a point of equal thickness between 10 and 60 degrees from the joint, at which the first and second wall thicknesses are equal. The differing crown thicknesses, and matching wall thicknesses at the point of equal thickness, means that the first and second bearing half shells have different eccentricities.

The present inventors have appreciated that in bearings in reciprocating or piston engines, the half shells of a cylindrical bearing can experience highly asymmetric load conditions during running. For example in connecting rod (conrod) bearings, one half shell is held in a relatively stiff upper (rod) side, while the other half shell is held on a relatively flexible lower (cap) side. When conventional symmetrical bearing shells are used in such an application, high peak oil film pressures (POFP) are generated by the stiff central portion of the conrod big-end. Reducing the eccentricity of the bearing can reduce the high POFP, but in such bearings reducing the eccentricity of the lower shell (the cap side shell) leads to increased contact severity and seizure risks at high engine speeds in the regions close to the end of the bore reliefs.

The present invention solves these problems by providing half shells having different eccentricities, so that the first half shell is provided with a lower eccentricity which reduces POFP in the bearing, while the second half shell retains a higher eccentricity which reduces contact severity and seizure risks at high engine speeds. The wall thickness of the half shells is configured to match at the points of equal thickness, in order to provide a smooth transition between the bearing bores of the two eccentric half shells, so the higher eccentricity of the second half shell is achieved by providing the second half shell with a greater crown thickness than the first half shell.

The present invention differs from many prior art bearings by varying the crown thickness of the two bearing halves. In DE3262556D1 for example, both crown thicknesses are identical, and at no point do the two bearing shells have the same wall thickness. While the Delta wall bearing of DE3262556D1 disclosed two half shells having different crown thicknesses, these bearing halves were of uniform thickness, and the walls of the half shells are not equal at a point between 10 and 60 degrees from the joint faces.

The thickness profile of the first half shell is preferably symmetrical about the first crown, and the thickness profile of the second half shell is preferably symmetrical about the second crown.

The first wall thickness is a thickness of the first half shell at the point of equal thickness. The second wall thickness is a thickness of the second half shell at the point of equal thickness. The point of equal thickness is position defined by its angular distance from the joint, or from the respective joint faces of the half shells. As the half shells have joint faces at either end, each half shell thus has two points of equal thickness arranged symmetrically about the crown.

The point of equal thickness is a point at which the wall thickness of the first half shell is equal to the wall thickness of the second half shell. The angular position of the point of equal thickness may be varied depending on the bearing type, but should be located between 10 and 60 degrees from the joint faces (the ends of the half shells). In other words, the point of equal thickness may be between 30 and 80 degrees from the crown of the respective half shell.

In a particularly preferred embodiment, for example, the two half shells may be configured so that the point of equal thickness is located an angular distance of 25 degrees from the joint. Thus at an angular distance of 25 degrees from the joint, the first half shell has a first wall thickness, and the second half shell has a second wall thickness which is identical to the first wall thickness.

The point of equal thickness is preferably not in a bore relief region, or crush relief region, of the bearing. Bore relief regions typically extend over an angular distance of less than 10 or 15 degrees from the joint.

The first wall thickness may be equal to the second wall thickness at a point of equal thickness greater than 15 degrees, or greater than 17.5 degrees, or greater than 20 degrees, or greater than 22.5 degrees, from the joint. The point of equal thickness may be located less than 45 degrees from the joint, for example less than 35 degrees from the joint.

In a particularly preferred embodiment, the first wall thickness may be equal to the second wall thickness at a point of equal thickness at an angular distance of 25 degrees from the joint.

The point of equal thickness may alternatively be described as a position of equal thickness, or an equal thickness position.

The first half shell and the second half shell may have the same thickness at the joint.

The crown of a bearing half shell is the centre of a semi-cylindrical half shell. The first and second crown thicknesses are thus measured at an angular distance of 90 degrees from the joint.

The dimensions of the bearings may vary depending on the application for which the bearing is intended.

In some particularly preferred embodiments, the second crown thickness is at least 6 µm greater than the first crown thickness. For example, the second crown thickness may be between 6 µm and 20 µm greater than the first crown thickness, or between 10 µm and 16 µm greater than the first crown thickness. The inventors have found such differences in crown thickness to be particularly advantageous for passenger car engine bearings, for example bearings such as main bearings and conrod big-end bearings for reciprocating engines for automotive applications.

"Eccentric" bearings have bearing surfaces which, instead of being semi-circular, comprise an oval or "lemon" cross-section, due to variations in the wall thickness of the bearing. Eccentricity is typically defined as the difference in bearing thickness between the crown of the bearing, and a section of the bearing a predetermined angle from the crown or the joint face.

The maximum theoretical value of a bearing's eccentricity is equal to the difference between the radius of the bearing and the radius of the journal (the radial oil clearance). A large difference between these radii helps to establish stable hydrodynamic lubrication, especially at high rotation speed. On the other hand, a bearing with a diameter significantly larger than the diameter of the journal may produce vibration and knocking under low loads.

In order to increase bearing eccentricity without changing the oil clearance, the inside bearing surface is produced with a non-round lemon shape by varying the thickness of the bearing wall. The bearing wall is thickest at the central crown, and gradually decreases towards the joint faces at either end of the half shells.

In the present invention, the second half shell may have a first eccentricity. The second eccentricity may be defined by the second crown thickness minus the shell wall thickness at an eccentricity angle, or an eccentricity point. The exact position of the eccentricity point varies across the industry, as different sources use different methods to quantify eccentricity.

In preferred embodiment, the eccentricity angle may preferably be defined as 25 degrees from the joint, relative to the geometric centre of the bearing outside surface.

In preferred embodiments, the first half shell is an eccentric half shell with a first eccentricity. The first eccentricity may be defined by the first crown thickness minus the second wall thickness at the eccentricity angle or eccentricity point.

In preferred embodiments of the present invention, the first eccentricity may be between 1 µm and 10 µm, or between 1 µm and 5 µm, or between 2 µm and 4 µm.

In preferred embodiments the second eccentricity may be between 10 µm and 35 µm, or between 10 µm and 30 µm, or between 11 µm and 21 µm, or between 15 µm and 17 µm. The magnitude of the eccentricity may vary depending on the intended application for the bearing. For example in heavy-duty or motorsport applications, higher eccentricities may be desirable.

Particularly preferably, the second half shell has a second eccentricity which is greater than a first eccentricity of the first half shell. In other words, the difference between the second crown thickness and the second wall thickness at the eccentricity point is greater than the difference between the first crown thickness and the first wall thickness at the eccentricity point.

In a preferred embodiment, the eccentricity point is the same as the point of equal thickness. Particularly preferably the eccentricity point is 25 degrees from the joint, and the point of equal thickness is 25 degrees from the joint.

In this embodiment, the matching first wall thicknesses at the point of equal thickness means that the differential eccentricity is governed mainly by the difference in crown thicknesses. The second eccentricity may in some preferred embodiments be between 6 µm and 20 µm greater than the first eccentricity, or between 10 µm and 16 µm greater than the first eccentricity.

The first half shell preferably has a first bearing surface having a constant radius of curvature over an angular distance of at least 140 degrees, or at least 160 degrees, or at least 170 degrees, or over the entire bearing surface.

The second half shell preferably has a second bearing surface having a constant radius of curvature over an angular distance of at least 140 degrees, or at least 160 degrees, or at least 170 degrees, or over the entire bearing surface.

The bearing surface of the first and second half shells are preferably each formed with a single bore, which imparts uniform radii of curvature. However, the bearing surfaces may be provided with bore relief regions adjacent to the joint faces. Bore relief, also known as joint face relief, is typically formed over relatively small end regions of the half shells, which may extend up to 10 degrees or 14 degrees from the joint faces for example. The bearing surfaces may be provided with bore relief regions which extend up to 10 or 15 degrees from the joint faces. In alternative embodiments, the bearing surfaces may be provided with bore relief regions which extend up to 20 degrees from the joint faces, as long as the bearings also comprise a point of equal thickness at a greater angle outside the bore relief regions. Outside the bore relief regions (if present), the bearing surfaces preferably have uniform radii of curvature.

In the bearing of the present invention, the first half shell is preferably configured to be a loaded half shell, and second half shell is configured to be an unloaded half shell. Thus the second half shell, which has a greater eccentricity than the first half shell, is preferably used as the unloaded half shell. The second half shell, which has the thicker crown, is preferably used in the unloaded position. This is notably the opposite of the configuration taught by the Delta wall prior art. In DE2359634A the thicker bearing half shell is loaded while running.

Bearings according to preferred embodiments of the invention may be particularly suitable for use in fluid-lubricated, or hydrodynamic, applications. The bearing may be a hydrodynamic bearing. Particularly advantageous applications for the bearings are as sliding bearings in combustion engines, for example crankshaft and/or camshaft supporting bearings, big end bearings and small end bushings. Bearings according to preferred embodiments of the invention may be particularly suitable for use in vehicle engines, including those equipped with stop-start engine technology in which the engine is subjected to a substantially greater number of starts over the life of the engine than in conventional engines and in which the crankshaft is regularly accelerated from rest before a uniform hydrodynamic film of lubricant is established on the bearing/running surface.

The bearing may be a sliding component for an engine, such as a big-end conrod bearing, a small-end conrod bearing, a main bearing, a journal bearing or the like. Particularly preferably the bearing may be suitable for use in engines such as automotive engines, land-based generators, or ship engines.

In one preferred embodiment, the bearing is a connecting rod big-end bearing for a reciprocating engine. The first half shell is preferably a rod-side connecting rod big-end bearing, and the second half shell is preferably a cap-side connecting rod big-end bearing. In this configuration, the first half shell is configured to be the loaded half shell, while the more eccentric second half shell is configured to be the unloaded half shell.

In another preferred embodiment, the bearing may be a main bearing for a reciprocating engine.

Preferably, at least one of the first and second bearing shells is provided with a distinguishing mark (or poka yoke). This may help them to be positioned appropriately (e.g. to be arranged as upper and lower bearing shells).

The bearing may comprise a backing layer and/or a bearing lining layer on the concave face of the backing layer. The substrate may optionally have one or both of: an overlay layer on the concave face of the bearing lining layer; and, one or more intermediate layers between the bearing overlay and the lining layer.

The wall thicknesses referred to above relate to the total thickness of the bearing shell from the outer surface to the bearing/running surface, regardless of how many layers are present.

Suitable bearing shells may have a steel backing, a bearing lining layer of an aluminium-based or copper-based alloy (including a copper-tin bronze-based alloy), an optional interlayer, and a polymer overlay, or running layer which may be applied to the bearing lining layer or interlayer by spraying or printing. The overlay may alternatively be a metal-based overlay layer which may be deposited by electro-plating or sputtering.

The curved inner surface of the bearing shells typically requires a running surface which has a suitable balance of hard properties, including wear resistance and fatigue resistance, and soft properties, including seizure resistance, and enhanced conformability and embeddability. Accordingly, the bearing lining layer, or any overlay layer, provides the running surface of the bearing shell. Typically, bearing shells with aluminium based alloy bearing lining layers may provide suitable running surfaces and may not require an overlay. In contrast, copper-based alloys of bearing shells with copper-based alloy bearing lining layers may not provide suitable properties for a running surface, and may therefore be provided with an overlay. Other suitable overlay materials will be readily apparent to the skilled person.

Suitable overlay materials may include any of the following: Polyamide-imide resin, acrylate resin, epoxy resin, fluoropolymer (e.g. PTFE), or any combination of these materials. Other suitable materials will be readily apparent to the skilled person. The polymer may comprise a composite of a plastics polymer matrix with particulate. The particulate may be hard particulate (e.g. ceramic powder, silica, and metal powder such as aluminium flakes) and/or soft particulate (e.g. MoS2 and graphite, and fluoropolymer such as PTFE). The polymer may comprise a matrix of a Polyamide-imide plastics polymer material and having distributed throughout the matrix: between about 5 and about 15% vol of a metal powder; between about 1 and about 15% vol of a fluoropolymer, the balance being the Polyamide-imide resin apart from incidental impurities.

In a second aspect of the present invention, there may be provided a bearing comprising a first semi-cylindrical half shell and a second semi-cylindrical half shell, in which the first and second half shells are configured to connect at a joint to form a cylindrical bearing. The first half shell has a first crown thickness at a crown of the first half shell, a first wall thickness between the crown and the joint, and a first bearing surface having a constant radius of curvature over an angular distance of at least 140 degrees. The second half shell has a second crown thickness at a crown of the second half shell, a second wall thickness between the crown and the joint, and a second bearing surface having a constant radius of curvature over an angular distance of at least 140 degrees. The first wall thickness may preferably be equal to the second wall thickness at a point of equal thickness between 10 and 60 degrees from the joint, and the second crown thickness is greater than the first crown thickness.

All features of the bearing which are described above in relation to the first aspect of the invention are equally applicable to the second aspect.

In a third aspect of the present invention, there may be provided a method of manufacturing a bearing, comprising the steps of:

forming a first half shell having a first crown thickness and a first wall thickness between the crown and a joint face; and forming a second half shell having a second crown thickness and a second wall thickness between the crown and a joint face;

in which the second crown thickness is greater than the first crown thickness, and in which the first wall thickness is equal to the second wall thickness at a point of equal thickness between 10 and 60 degrees from the joint faces. The method may comprise the step of forming a first bearing surface of the first half shell having a first radius of curvature. The bearing surface of the first half shell may be semi-circular (i.e. non-eccentric), in which case the centre of the first bearing surface will be the same as the geometric centre of the outer surface of the first half shell. Alternatively the first half shell may be eccentric, in which case the geometric centre of the first bearing surface may be offset relative to the geometric centre of the first half shell, This step may be performed by drilling, or boring, the concave side of the half shells, with the axis of the boring tool aligned parallel with the axis of the bearing shells. The bore profile is circular, such that the radii of curvature of the resulting surfaces may be controlled by selecting a boring tool having that radius of curvature.

The method may comprise the step of forming a second bearing surface of the second half shell having a second radius of curvature different from that of the first bearing surface, the centre of the second bearing surface being offset relative to the geometric centre of the second half shell.

The second bearing surface is formed by machining the bore with the centre of the boring tool offset from the centre of the cup that defines the outer diameter of the bearing. Therefore the bore is circular (when the bearing is fitted in a circular housing), with the second radius of curvature being larger than that of the outer diameter.

Preferably both the first and second half shells are formed as eccentric bearing half shells, in which case the first half shell may be machined in the same way.

The radius of curvature of the second bearing surface is preferably larger than the radius of curvature of the first bearing surface.

The first and the second radii of curvature must be selected so that the first and second half shells have a point of equal thickness somewhere between 10 and 60 degrees from the joint faces.

The method may comprise the step of forming the first half shell having a first eccentricity, and forming the second half shell having a second eccentricity greater than the first eccentricity.

The method may comprise the step of forming bore relief regions or joint face relief regions on the first and/or second half shells. Bore relief regions may be formed by removal of material from the respective first or second bearing shells. Bore relief regions may be formed within 10 degrees or 15 degrees of the joint faces, so that the point of equal thickness is not located in the bore relief regions.

The method may comprise the step of applying a sliding layer to the bearing surface of each bearing half shell, as is conventional in the art.

All features of the bearing which are described above in relation to the first and second aspects of the invention are equally applicable to the third aspect.

BRIEF DESCRIPTION OF THE DRAWINGS

Some example or preferred embodiments of the present invention will now be described in detail, by way of example only, with reference to the accompanying drawings, in which.

DETAILED DESCRIPTION

Figure 1:
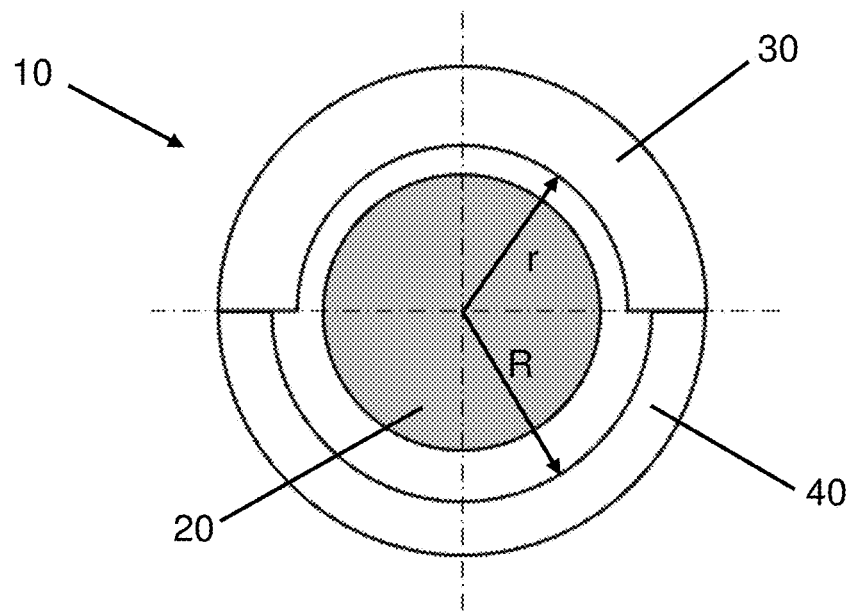
FIG. 1 is a schematic diagram of a prior art plain bearing according to the "Delta wall" design.

FIG. 1 shows a plain bearing 10 having the "Delta wall" design known in the prior art, and a bearing journal 20 positioned in the bearing 10.

The Delta wall bearing 10 consists of a first semi-cylindrical half shell 30 and a second semi-cylindrical half shell 40. The wall thicknesses of the two half shells are different, with the first half shell 30 having a thicker wall than the second half shell 40, but the wall thickness of each half shell is uniform over the half shell. The difference in wall thickness leads to a difference in the radius of curvature of the bearing surfaces facing the journal. The thicker first half shell leads to a smaller radius of curvature r of the first bearing surface, so that the clearance between the first bearing surface and the journal is reduced. The second half shell has a thinner shell wall, and the second bearing surface has a larger radius of curvature R so that there is a greater clearance between the journal and the second half shell.

DE2359634A1, which relates to the Delta wall bearing 10, teaches that the bearing surface with the larger radius of curvature R (the second half shell 40 in this case) should be positioned on the more flexible cap-side of a conrod big-end bearing. This document teaches that by positioning the thicker first half shell 20 on the rod-side, when the conrod is subjected to a compressive load, the increased thickness and reduced radius of curvature r of the first half shell 20 increases the load capacity of the bearing. In the event of tensile stress, the thinner second half shell 40 is deformed, but due to the greater lateral play allowed by the larger radius of curvature, DE2359634A1 teaches that lateral jamming in the vicinity of the joint is prevented. DE2359634A1 thus teaches away from the arrangement of the present invention, in which the half shell having a thicker crown is arranged in the unloaded position.

The Delta wall bearing 10 may be provided with joint face relief in the region immediately adjacent to the joint between the half shells, which typically spans an angular distance of a few degrees from the joint, but this joint face relief is omitted from FIG. 1 for ease of illustration.

Figure 2:
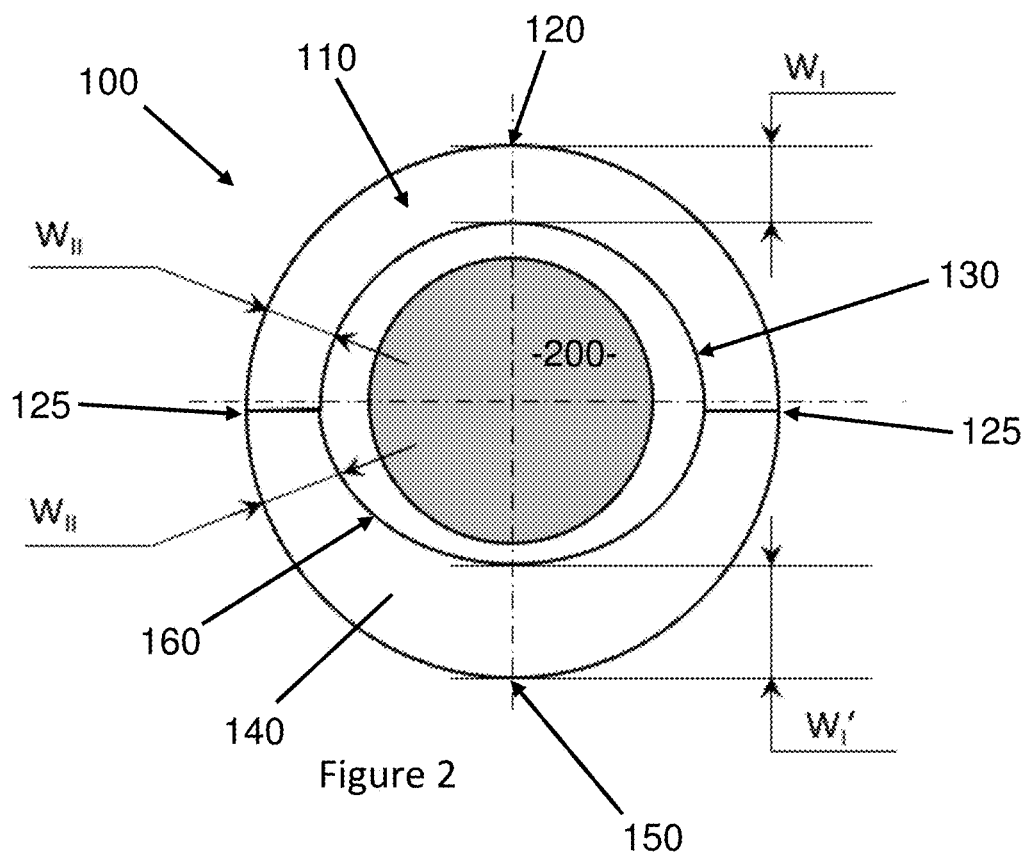
FIG. 2 is a schematic end-on view of a bearing according to an embodiment of the present invention.

FIG. 2 illustrates a preferred embodiment of the bearing 100 of the present invention. The relative dimensions are exaggerated for the purposes of illustration.

Bearing 100 is a cylindrical bearing made up of two semi-cylindrical half shells. Each half shell has a semi-cylindrical outer surface and two joint faces 125, so that when the two half shells are connected together into a cylindrical bearing as shown, the outer surface of the bearing 100 is cylindrical in shape.

A bearing journal 200 is shown in position inside the bearing 100.

The bearing 100 is made up of a first semi-cylindrical half shell 110 and a second semi-cylindrical half shell 140.

The first half shell 110 has a first crown thickness $W_I$, which is the thickness of the shell wall at the first crown 120 half way between two joint faces 125 at either end of the half shell. A range of crown thicknesses for bearing shells are known in the art, and the exact thickness may vary depending on the intended application for a given bearing.

The concave inner surface of the first half shell forms a first bearing surface 130 of the first half shell. In use the bearing surface will be covered by further layers as described above, but for simplicity of illustration, these further layers are not shown in the Figures.

The first bearing surface is eccentric, such that the first half shell does not have a uniform wall thickness across its half-circumference. Instead, the first half shell is thickest at the first crown 120, and thinner at the two joint faces 125.

The second half shell 140 has a first crown thickness $W_I'$, which is the thickness of the shell wall at the second crown 150 half way between two joint faces 125 at either end of the half shell. A range of crown thicknesses for bearing shells are known in the art, and the exact thickness may vary depending on the application for a given bearing.

The concave inner surface of the second half shell forms a second bearing surface 160 of the second half shell.

The second half shell 140 does not have a uniform wall thickness. Instead, the second half shell is thickest at the second crown 150, and thinner at the two joint faces 125, so that the second bearing surface 160 is eccentric. The second crown thickness $W_I'$ is significantly greater than the first crown thickness $W_I$, such that the second half shell 140 has a significantly greater eccentricity than the first half shell 110.

At four points of equal thickness either side of the joint faces 125, the thicknesses of both the first and second half shell walls is equal, as all walls have a thickness of $W_{II}$. At this angular separation from the joint faces, measured from the geometric centre of the bearing 100 relative to the cylindrical outer surface, the walls of each half shell have the same thickness. This angular separation from the joint faces 125 is defined as the point of equal thickness.

A range of embodiments are possible within the scope of the present invention, and thus the exact position of the point of equal thickness may be varied within a range of around to 60 degrees from the joint faces 125, or 15 to 60, or 20 to 60 degrees from the joint faces 125.

In the preferred embodiment illustrated in FIG. 2, the point of equal thickness is located at an angular distance of 25 degrees from the joint faces 125, such that the walls of both the first and second half shells have a thickness of $W_{II}$ at 25 degrees from the joint faces 125. Both half shells are symmetrical about their respective crowns, so the shell walls have a thickness of $W_{II}$ at 25 degrees from the joint faces at either end of the half shells.

The eccentricity of each half shell is defined as the difference between the crown thickness and the wall thickness at an eccentricity point, which in a preferred embodiment may be 25 degrees from the joint, relative to the geometric centre of the bearing outside surface. In this embodiment the eccentricity angle is the same as the angular position of the equal thickness point, but this is not essential, as the equal thickness point could be located at different angles, and alternative definitions of eccentricity are used in the art.

In this embodiment, as the eccentricity angle is the same as the angular position of the equal thickness point, the eccentricity of the first half shell 110 can be calculated as $W_I - W_{II}$=first eccentricity, and the eccentricity of the second half shell 140 can be calculated as $W_I' - W_{II}$=second eccentricity.

In a particularly preferred embodiment, the second half shell 140 has a second eccentricity of 16 μm, while the first half shell 110 has a first eccentricity of only 3 μm. This difference is caused by the difference in thickness between the second crown and the first crown.

The difference between $W_I$ and $W_I'$ is equal to the difference in eccentricity ($W_I$ being thinner than $W_I'$). In this example, the difference in eccentricity is 16 μm−3 μm=13 μm, therefore $W_I$ is 13 μm smaller than $W_I'$.

The exact values of $W_I$ and $W_I'$ can easily be adjusted in order to obtain the required total clearance for the bearing while maintaining the condition above.

Although not illustrated in FIG. 2 for ease of view, both the first and second half shells are provided with joint face relief regions on either side of the joint faces. Such joint face relief regions should extend only up to 10 degrees, or up to 15 degrees, on either side of the joints. The point of equal thickness is not located in a joint face relief region.

Figure 3:
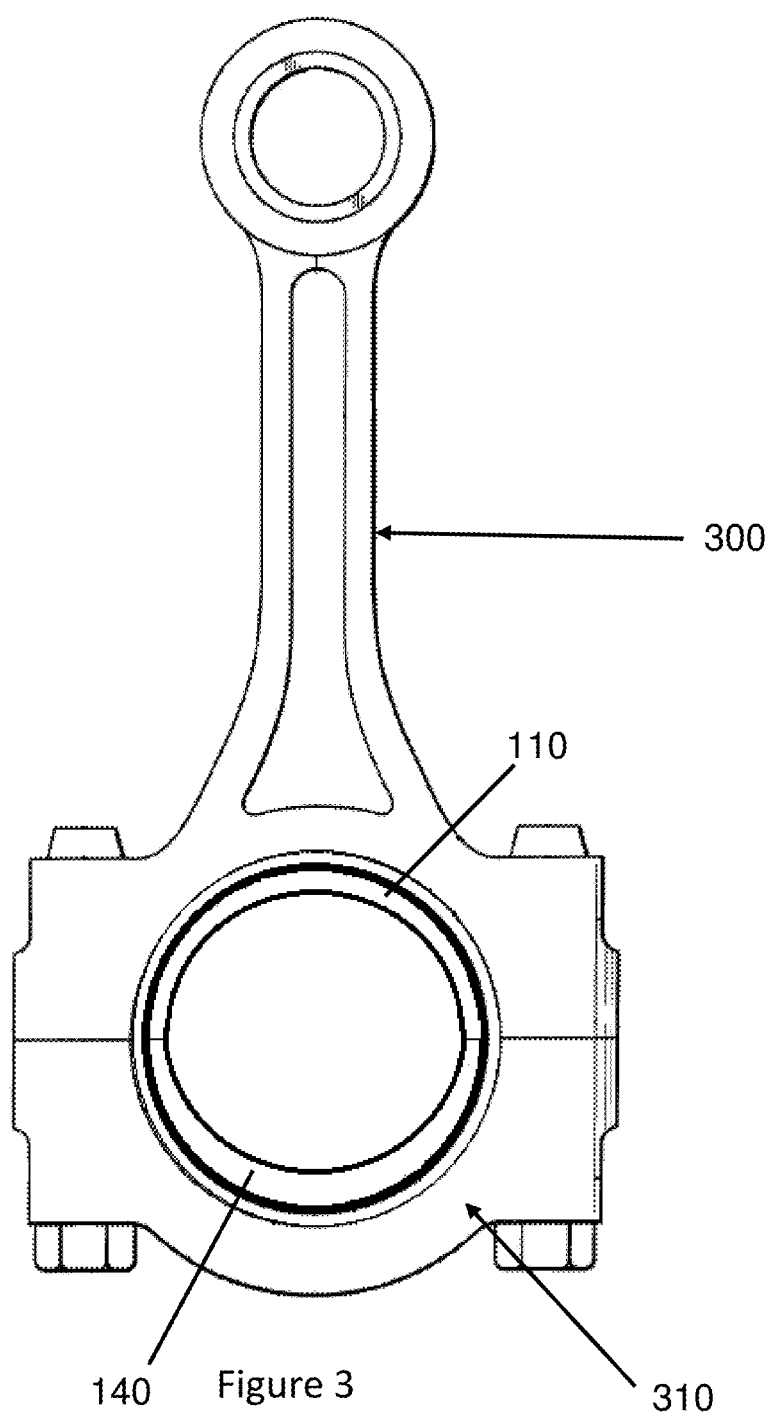
FIG. 3 is a schematic illustration of a connecting rod for an internal combustion engine, comprising a big-end bearing according to an embodiment of the present invention.

FIG. 3 illustrates the bearing 100 in use as a conrod big-end bearing for an internal combustion engine. In this embodiment, the less eccentric first half shell 110 is used as the rod-side half shell which is loaded in use, while the more eccentric second half shell 140 is positioned as the cap-side half shell on the unloaded but more flexible end-cap 310 of the conrod 300. This arrangement is the opposite of that used in the Delta wall prior art bearing, where the thicker half shell was used as the loaded rod-side half shell.

The bearing shells according to the invention are manufactured from strip material. Blanks are punched out of this strip material and formed into semicircular bearing shells, for example by die pressing or roll forming. A desired overhang is then created by clearing the partial surfaces and then the width of the bearing shell is turned to the final dimensions and the edges are broken. The eccentric profiles of the bearing surfaces are produced by drilling or broaching in a manner which is known for producing eccentric half shells. In contrast to prior art methods, however, the first and second half shells are produced using drill bits of different diameters.

The bearing surfaces are made eccentric by positioning the drill bits with their centres offset from the geometric centre of the bearing half shell. The perimeter of the drill bit thus forms a bearing surface of constant radius of curvature on the concave inner side of the half shell, leaving the half shell with a non-uniform thickness which is thickest at the crown and thinner towards the edges near the joint faces.

In order to produce two half shells having different eccentricities, but equal wall thicknesses at the point of equal thickness, different diameter drill bits are used.

The half shells may be provided with joint face relief regions using known methods.

Finally, a sliding layer is applied to the inside of the bearings. This can be done in a known manner galvanically, by spraying or spraying on or by a PVD method such as electron beam vapor deposition or sputtering. The sliding layer extends either over the entire profile of the bearing metal layer with a uniform thickness. In the case of two-layer plain bearings, for example made of a steel supporting layer and a bearing metal layer made of an aluminum alloy, the sliding layer can be omitted. The present invention also applies to bronze bearings without a sliding layer, in which the counter-rotor runs directly on the bronze layer. The profile according to the invention on the inside of the bearing shell can be formed both in the case of a bearing shell made of solid material (bronze) and in the case of a bearing shell with a steel support layer and a layer of bearing metal applied thereto. The bearing metal layer preferably consists of a bronze to which a sliding layer is applied, for example galvanically. The sliding layer can be formed from an aluminum-tin alloy, for example.

The invention claimed is:

1. A bearing, comprising:
   a first half shell and an eccentric second half shell, the first half shell and the second half shell configured to connect at a joint to form a cylindrical bearing;
   the first half shell having a first crown thickness at a first crown of the first half shell, and a first wall thickness between the first crown and the joint; and
   the second half shell having a second crown thickness at a second crown of the second half shell, and a second wall thickness between the second crown and the joint;
   wherein the second crown thickness is greater than the first crown thickness, and the first wall thickness is equal to the second wall thickness at a point of equal thickness between 10 and 60 degrees from the joint
   wherein at least one of: the first half shell has a first bearing surface having a constant radius of curvature over an angular distance of at least 140 degrees, and the second eccentric half shell has a second bearing surface having a constant radius of curvature over an angular distance of at least 140 degrees; and
   wherein the bearing is a connecting rod big-end bearing for a reciprocating engine, and the second eccentric half shell is a cap-side connecting rod big-end bearing.

2. The bearing according to claim 1, wherein the first wall thickness is equal to the second wall thickness at a point of equal thickness greater than 15 degrees from the joint, and/or less than 45 degrees from the joint.

3. The bearing according to claim 1, wherein the first wall thickness is equal to the second wall thickness at a point of equal thickness at an angular distance of 25 degrees from the joint.

4. The bearing according to claim 1, wherein the second crown thickness is at least 6 µm greater than the first crown thickness.

5. The bearing according to claim 1, wherein the second half shell has a second eccentricity defined by the second crown thickness minus the second wall thickness at an eccentricity point.

6. The bearing according to claim 5, wherein the second eccentricity is between 10 µm and 35 µm.

7. The bearing according to claim 1, wherein the first half shell is an eccentric half shell and has a first eccentricity defined by the first crown thickness minus the first wall thickness at an eccentricity point.

8. The bearing according to claim 7, wherein the first eccentricity is between 1 µm and 10 µm.

9. The bearing according to claim 7, wherein a second eccentricity of the second half shell defined by the second crown thickness minus the second wall thickness is greater than the first eccentricity.

10. The bearing according to claim 1, wherein the first half shell is configured to be a loaded half shell, and second half shell is configured to be an unloaded half shell.

11. The bearing according to claim 1, wherein the bearing is a main bearing for a reciprocating engine.

12. A method of manufacturing a bearing, comprising the steps of:
forming a first half shell having a first crown thickness at a first crown and a first wall thickness between the first crown and a joint face; and
forming a second half shell having a second crown thickness at a second crown and a second wall thickness between the second crown and a joint face;
wherein the second crown thickness is greater than the first crown thickness, and the first wall thickness is equal to the second wall thickness at a point of equal thickness between 10 and 60 degrees from the joint faces;
wherein at least one of: the first half shell is formed with a first bearing surface having a constant radius of curvature over an angular distance of at least 140 degrees, and the second half shell is formed with a second bearing surface having a constant radius of curvature over an angular distance of at least 140 degrees; and
wherein the bearing is a connecting rod big-end bearing for a reciprocating engine, and the second half shell is a cap-side connecting rod big-end bearing.

13. The method according to claim 12, wherein the second bearing surface is an eccentric second bearing surface of the second half shell where the second radius of curvature different from that of the first bearing surface, a centre of the second bearing surface being offset relative to a geometric centre of the second half shell.

14. The method according to claim 13, wherein a centre of the first bearing surface is offset relative to a geometric centre of the first half shell.

15. The method according to claim 12, wherein the second crown thickness is at least 6 µm greater than the first crown thickness.

16. The bearing according to claim 5, wherein the eccentricity point is an angular distance of 25 degrees from the joint.

17. The bearing according to claim 6, wherein the second eccentricity is greater than a first eccentricity of the first half shell defined by the first crown thickness minus the first wall thickness.

18. The bearing according to claim 7, wherein the eccentricity point is an angular distance of 25 degrees from the joint.

* * * * *